(12) United States Patent
Liao

(10) Patent No.: US 7,513,765 B2
(45) Date of Patent: Apr. 7, 2009

(54) SPIKE MOLD STRUCTURE

(76) Inventor: I-Chung Liao, No. 16, Lane 73, Lu Gu Rd., Wufeng Hsiang, Taichung (TW)

( * ) Notice: Subject to any disclaimer, the term of this patent is extended or adjusted under 35 U.S.C. 154(b) by 534 days.

(21) Appl. No.: 11/415,217

(22) Filed: May 2, 2006

(65) Prior Publication Data

US 2007/0259068 A1 Nov. 8, 2007

(51) Int. Cl.
*B29C 45/14* (2006.01)
(52) U.S. Cl. .................. 425/112; 425/125; 425/577
(58) Field of Classification Search .............. 425/112, 425/125, 577
See application file for complete search history.

(56) References Cited

U.S. PATENT DOCUMENTS

| | | | | |
|---|---|---|---|---|
| 3,529,370 A | * | 9/1970 | Bernier et al. | 36/59 R |
| 3,925,529 A | * | 12/1975 | Bernier et al. | 264/244 |
| 5,673,472 A | * | 10/1997 | Muller | 29/432.1 |
| 5,906,059 A | * | 5/1999 | Singer et al. | 36/134 |
| 6,551,093 B2 | * | 4/2003 | Taha | 425/556 |
| 2004/0237349 A1 | * | 12/2004 | Terashima | 36/67 A |
| 2007/0269551 A1 | * | 11/2007 | Liao | 425/577 |

FOREIGN PATENT DOCUMENTS

| CN | 588980 | 5/2004 |
|---|---|---|
| CN | M266736 | 6/2005 |

* cited by examiner

*Primary Examiner*—Robert B Davis
(74) *Attorney, Agent, or Firm*—Rosenberg, Klein & Lee

(57) ABSTRACT

A spike mold structure includes a first male mold base having a plurality of male molds and at least one firing pin, and a female mold base having a first fixing board, a second fixing board, a plurality of outer female molds and inner female mold. The second fixing board has at least one sliding rod, and the sliding rod has an actuating block. One surface of the first fixing board has a plurality of convex blocks. A plurality of concave slots are located at the surface of the sliding rod. The thimbles push the actuating block to make the sliding rod slidingly move so that the first fixing board and second fixing board are closely embedded or have a gap. Therefore, there is a displacement between the outer and the inner female mold. The spike mold structure is used to mold a bi-colored spike having increased strength.

10 Claims, 17 Drawing Sheets

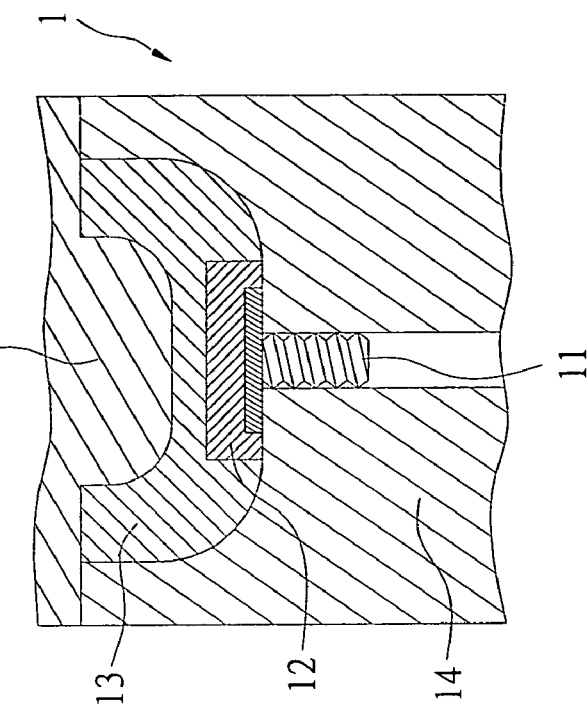
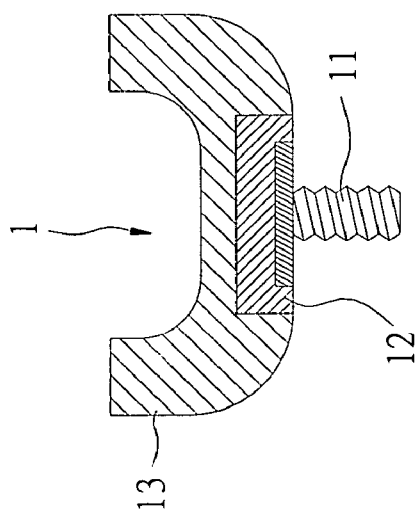
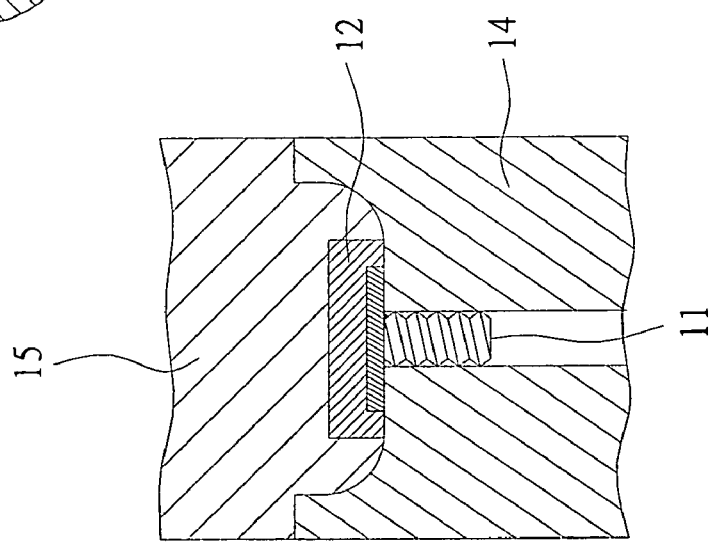
FIG. 1A PRIOR ART
FIG. 1B PRIOR ART
FIG. 1C PRIOR ART

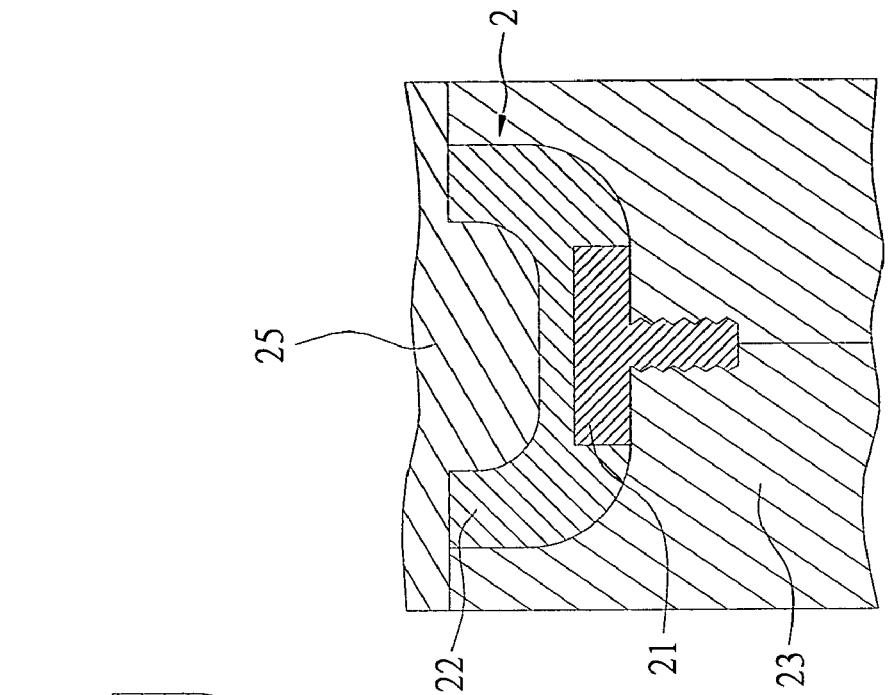
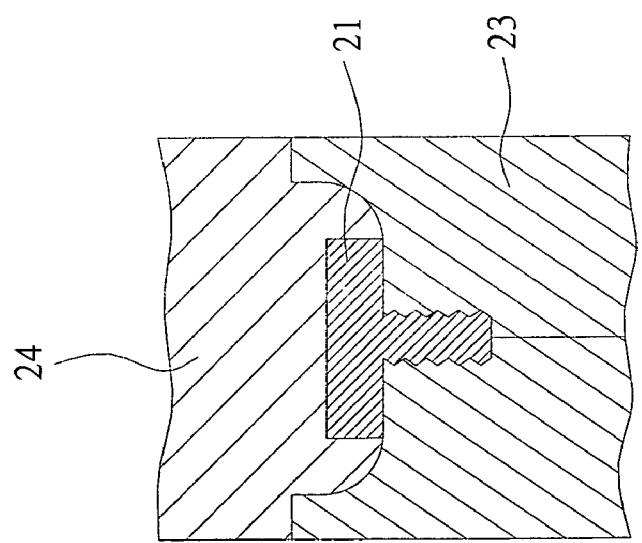

SPIKE MOLD STRUCTURE

BACKGROUND OF THE INVENTION

1. Field of the Invention

The present invention relates to a spike mold structure. In particular, this invention relates to a spike mold structure that can be formed via two continuous processes.

2. Description of the Related Art

The golf spike (sometimes also known as a cleat), such as the spike published in Taiwan patent T.W. 588980, and the spike set published in Taiwan patent T.W. 266736, includes a connection part and a spike part. The connection part is usually made of metal or macromolecule material and is formed by an injection molding process. The spike part is made of macromolecule material and is formed on the connection part by an injection molding process.

Generally, when a spike is manufactured, two steps are needed. Firstly, the connection part is manufactured. Then, the spike part is molded on the connection part. When the connection part is made of metal, the spike is molded on the connection via an injection molding process. If the connection part is made of macromolecule material, the connection part is formed using an injection molding machine. Then, the connection part is moved to another machine to form the spike part. However, when the spike part having two different colors is molded on the connection part made of metal or molding the connection part and the spike part using the same machine, two continuous injection molding processes are needed.

Reference is made to FIG. 1A~2C, which show the two continuous injection molding processes of the prior art. FIG. 1A is a schematic diagram of the spike 1. The spike 1 includes a connection part 11, a base part 12, and a spike part 13. The connection part 11 is made of metal. The base part 2 and the spike part 3 are made of macromolecule materials that are different in color. Firstly, the connection part 11 is placed on a first female mold 14. Then, a first male mold 15 is used for molding the base part 12. After that, a second male mold 16 is used for molding the spike part 13. Thereby, the spike 1 having two different colors is produced. FIG. 2A is a schematic diagram of the spike 2. The spike 2 includes a connection part 21 and a spike part 22. The connection part 21 and the spike part 22 are made of macromolecule materials that are different in color. Firstly, the connection part 21 is molded via a second female mold 23 and a third male mold 24. Then, a fourth male mold 25 is used for molding the spike part 22. Thereby, the spike 2 is manufactured.

For the spike 1 and the spike 2 manufactured via two molding processes, the connection strength of the connection structure located at the first molding part and the second molding part, means the connection area between the base part 12 and the spike part 13 of spike 1. The connection area between the connection part 21 and the spike part 22 of spike 2, is weaker. There further exists a problem of the spike dropping from the shoe that causes users to be hurt when they are exercising.

SUMMARY OF THE INVENTION

One particular aspect of the present invention is to provide a spike mold structure. The spike having two colors is molded and has improved strength. Two continuous molding processes are adapted to increase manufacturing efficiency and decrease manpower costs.

The spike mold structure includes a first male mold base and at least one female mold base. The first male mold base includes a first male mold fixing base, a plurality of first male molds located at the first male mold fixing base, and at least one firing pin located at one side of the first male mold fixing base. The female mold base corresponds to the first male mold base. The female mold base includes a first female mold fixing base, a plurality of outer female molds, a plurality of inner female molds, and a plurality of thimbles. The first female mold fixing base includes a first fixing board and a second fixing board. The first fixing board and the second fixing board have a plurality of inner mold holes and their number and location correspond to the first male molds. The second fixing board has at least one wedged slot and a sliding rod installed in the wedged slot. At the two ends of the sliding rod, there is an actuating block. One surface of the sliding rod that is adjacent to the first fixing board has a plurality of concave slots. The first fixing board also has a plurality of convex blocks that correspond to the concave slots of the sliding slots. The actuating block corresponds to the firing pin of the first male mold fixing base. The outer female molds are individually located at another surface of the first fixing board of the first female fixing base that is opposite to the convex block. A through hole is formed at an inner part of each of the outer female mold and the through hole corresponds to the inner mold hole of the two first fixing boards. The inner female molds are plugged into the through hole of the outer female mold and are plugged into the inner mold holes of the corresponding first female fixing base. The end of the inner female molds that is far away from the first male mold is installed at the second female fixing base. Each of the inner female molds has a through hole. The thimbles are individually located at a thimble base and are plugged into the corresponding through hole of the inner female molds.

The convex blocks located at the first fixing board and the concave slots on the second fixing board make the two second fixing boards and the two sliding rods insert into or push and contact each other so that the two first fixing boards are close to the two second fixing boards or the two first fixing boards are at a distance from the two second fixing boards. The outer female molds installed at the two first fixing boards can be moved within a limited distance. Therefore, the spike mold structure is used for molding the spike having two colors and the spike has increased strength.

Another spike mold structure includes a male mold base and a female mold base. The male mold base includes a male mold fixing base, a plurality of first male molds located at one side of the male mold fixing base, a plurality of second male molds located at another side of the male mold fixing base, and at least two firing pins installed at the male mold fixing base and located at the same side that corresponds to the first male molds and the second male molds. The female mold base corresponds to the male mold base. The female mold base includes two first female mold fixing bases, a plurality of first female molds, a plurality of second female molds, a plurality of third female molds, and a plurality of thimbles. The two first female mold fixing bases individually correspond to the first male molds and the second male molds. The first female mold fixing base includes a first fixing board and a second fixing board. The two first fixing boards and the two second fixing boards have inner mold holes that correspond to the male molds. Each of the two second fixing boards has at least one wedged slot and a sliding rod is installed in the wedged slot. At the two ends of the sliding rod, there is an actuating block. One surface of the sliding rod that is adjacent to the first fixing board has a plurality of concave slots. The first fixing board also has a plurality of convex blocks that correspond to the concave slots of the sliding slots. The actuating block corresponds to the firing pin of the male mold fixing base. The first female molds are individually located at another surface of the first fixing board of the first female fixing base that is opposite to the convex block. A through hole is formed at an inner part of each of the first female molds and the through hole corresponds to the inner mold hole of the two first fixing boards. The second female molds are plugged into the through holes of the first female molds and are plugged into the inner mold holes of the corresponding two first female fixing base. One end of the second female molds that is far away from the first male mold and the second male mold is installed at one side of the second female fixing base that is adjacent to the first female fixing base. Each of the second female molds has a through hole. The third female molds are plugged into the through holes of the second female molds. One end of the third female molds that are far away from the first male mold and the second male mold is installed at one side of the second female fixing base that is far away from the first female fixing base. Each of the third female molds has a through hole. The thimbles are individually located at two thimble bases and are plugged into the through hole of the corresponding third female molds.

The convex blocks located at the first fixing board and the concave slots on the second fixing board make the two second fixing boards and the two sliding rods insert into or push and contact to each other so that the two first fixing boards are close to the two second fixing boards or the two first fixing boards are at a distance from the two second fixing boards. The second female molds installed at the two first fixing boards can be moved within a limited distance. Therefore, the spike mold structure is used for molding the spike having two colors and the spike has increased strength. Furthermore, the molding machine can make the female mold base rotate 180 degrees so as to fit in with the two firing pins to push the actuating block and make the two sliding rods slide. The spike mold structure molds the spike having two colors by two continuous injection molding processes to increase manufacturing efficiency and decrease manpower costs.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows:

FIG. 1A is a schematic diagram of the first spike having two colors of the prior art;

FIG. 1B is a schematic diagram of the first spike having two colors having been molded by the first injection molding process of the prior art;

FIG. 1C is a schematic diagram of the first spike having two colors having been molded by the second injection molding process of the prior art;

FIG. 2A is a schematic diagram of the second spike having two colors of the prior art;

FIG. 2B is a schematic diagram of the second spike having two colors having been molded by the first injection molding process of the prior art;

FIG. 2C is a schematic diagram of the second spike having two colors having been molded by the second injection molding process of the prior art;

DETAILED DESCRIPTION OF THE PREFERRED EMBODIMENTS

Figure 3:
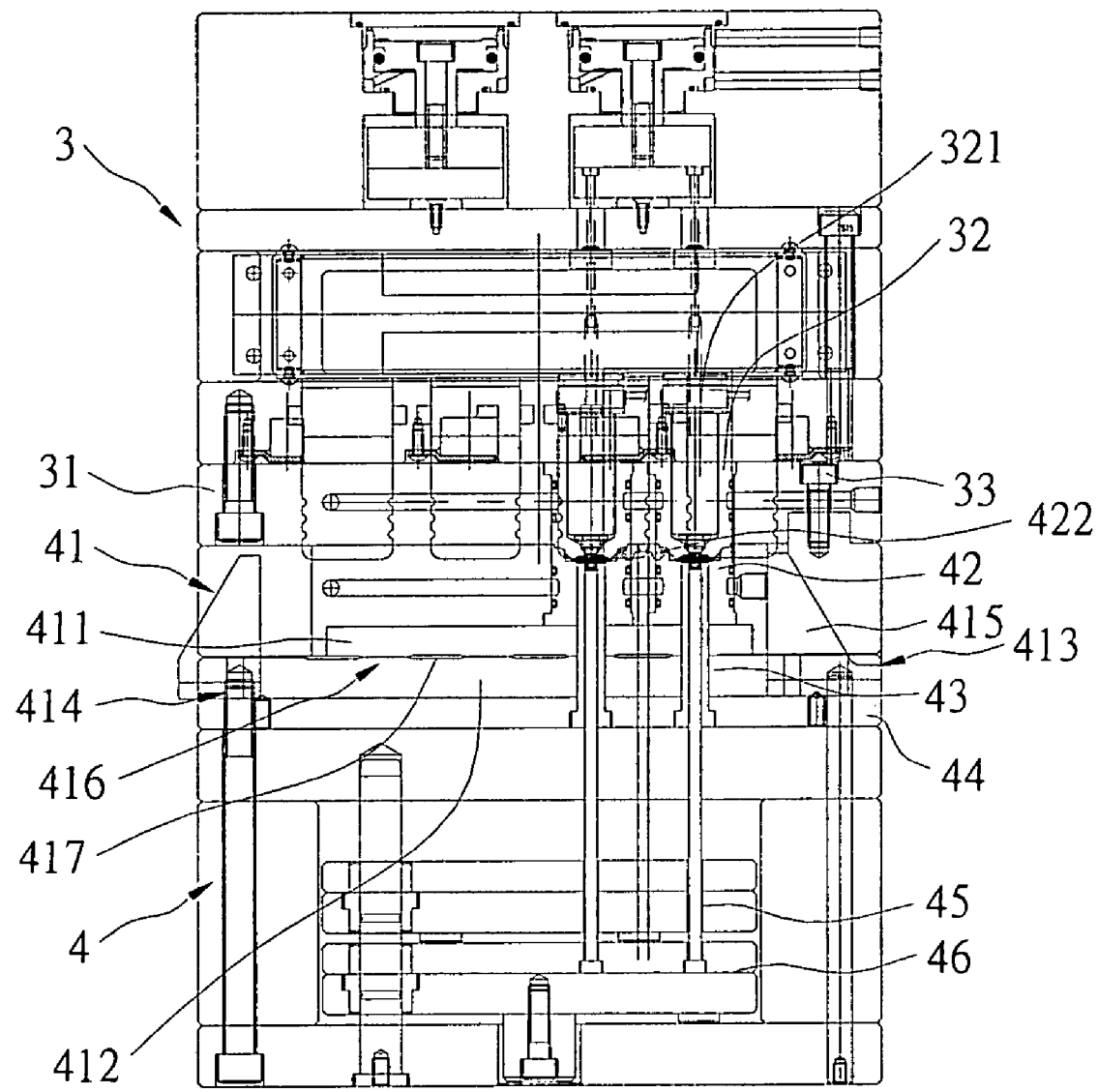
FIG. 3 is a schematic diagram of the first male mold base corresponding to a female mold base of the first embodiment of the present invention.
Figure 10:
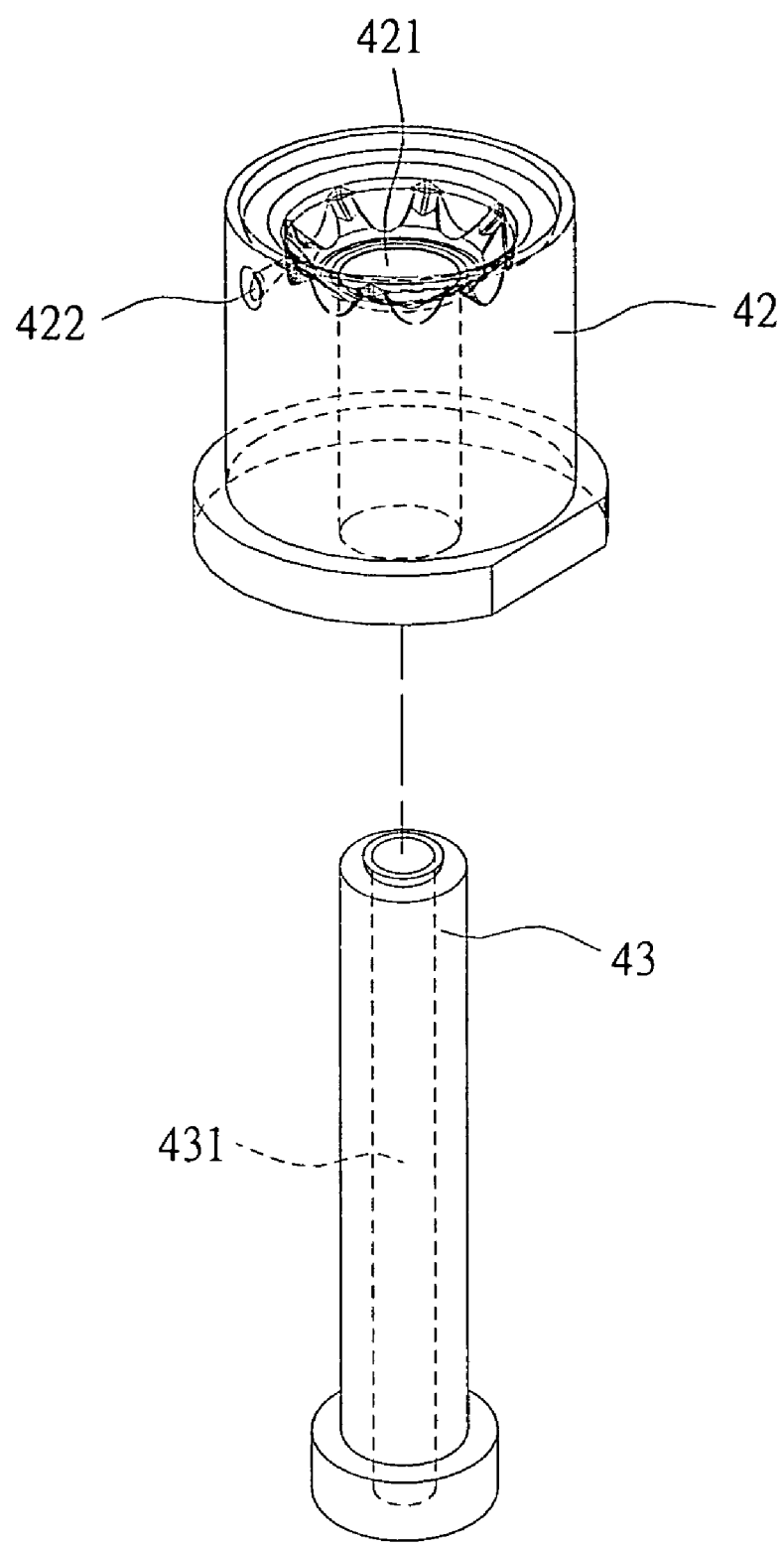
FIG. 10 is an exploded perspective view of the inner female mold and the outer female mold of the first embodiment of the present invention.

Reference is made to FIGS. 3 and 10, which shows the first embodiment of the present invention. The spike mold structure includes a first male mold base 3, a second male mold base 5, and at least one female mold base 4. The first male mold base 3 and the second male mold base 5 individually correspond to the female mold base 4.

Figure 5A:
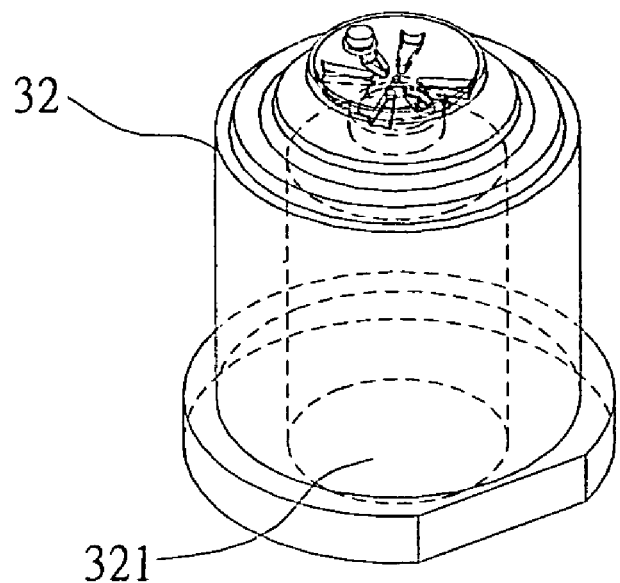
FIG. 5A is a perspective view of the first male mold of the first embodiment of the present invention.
Figure 5B:
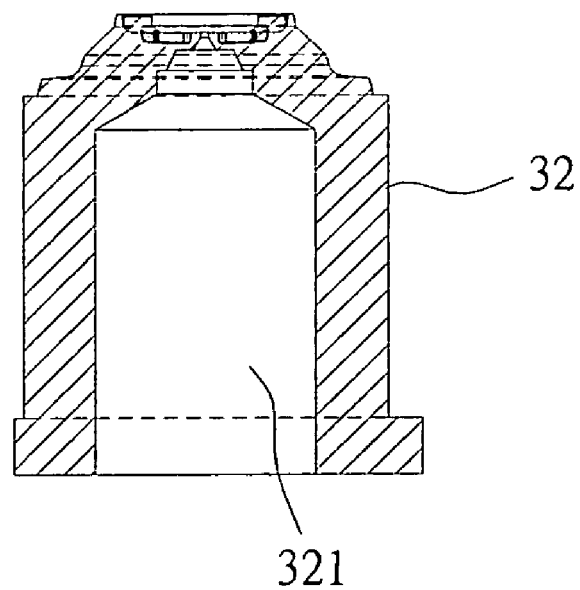
FIG. 5B is a cross-sectional view of the first male mold of the first embodiment of the present invention.

The first male mold base 3 includes a first male mold fixing base 31, a plurality of first male molds 32, and at least one firing pin 33. The first male molds 32 are located at the first male mold fixing base 31. The firing pin 33 is located at one side of the first male mold fixing base 31. At an inner part of each of the first male molds 32, a runner 321 is formed (as shown in FIGS. 5A and 5B). The plastic material is injected from the runners 321.

Figure 6:
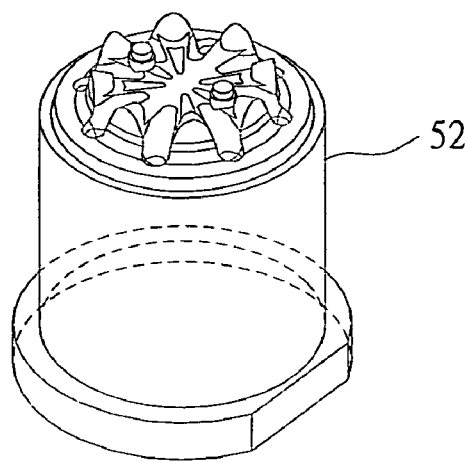
FIG. 6 is a perspective view of the second male mold of the first embodiment of the present invention.

The second male mold base 5 includes a second male mold fixing base 51, a plurality of second male molds 52, and at least one firing pin 53. The second male molds 52 (FIG. 6) are located at the second male mold fixing base 51. The firing pin 53 is located at one side of the second male mold fixing base 51.

The female mold base 4 includes a first female mold fixing base 41, a plurality of outer female molds 42, a plurality of inner female molds 43, a plurality of thimbles 44, and a thimble base 45.

Figure 7A:
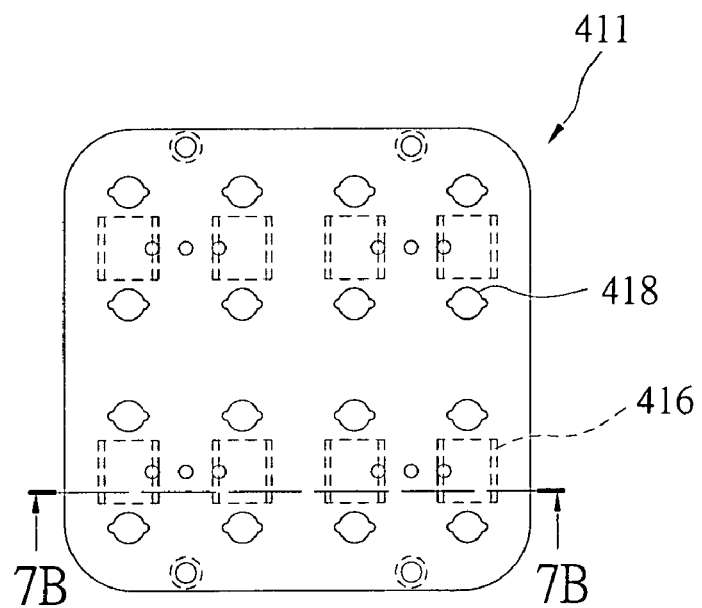
FIG. 7A is a top view of the first fixing board of the present invention.
Figure 7B:
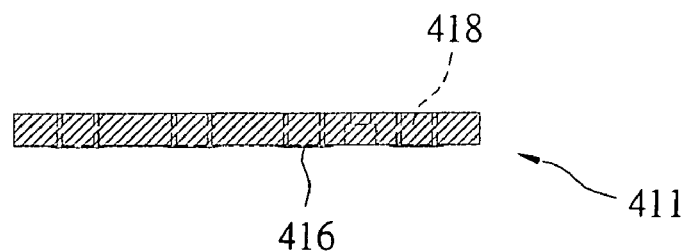
FIG. 7B is a cross-sectional view of the first fixing board of the present invention.

The first female mold fixing base 41 includes a first fixing board 411 and a second fixing board 412. The first fixing board 411 has a plurality of convex blocks 416 and a plurality of inner mold holes 418. The number and location of the inner mold holes 418 correspond to the first male molds 32 or the second male molds 52. As shown in FIGS. 7A and 7B, the first fixing board 411 has eight convex blocks 416 and sixteen inner mold holes 418. The inner mold holes 418 pass through the first fixing board 41 land are disposed at the same distance to form a square. One of the two surfaces of the first fixing board 411 being passed through by the inner mold holes 418 has the convex blocks 416. The convex blocks 416 are individually located between the two adjacent inner mold holes 418 of the opposite two sides, and are placed into two rows. Each row has four inner mold holes 418.

Figure 8A:
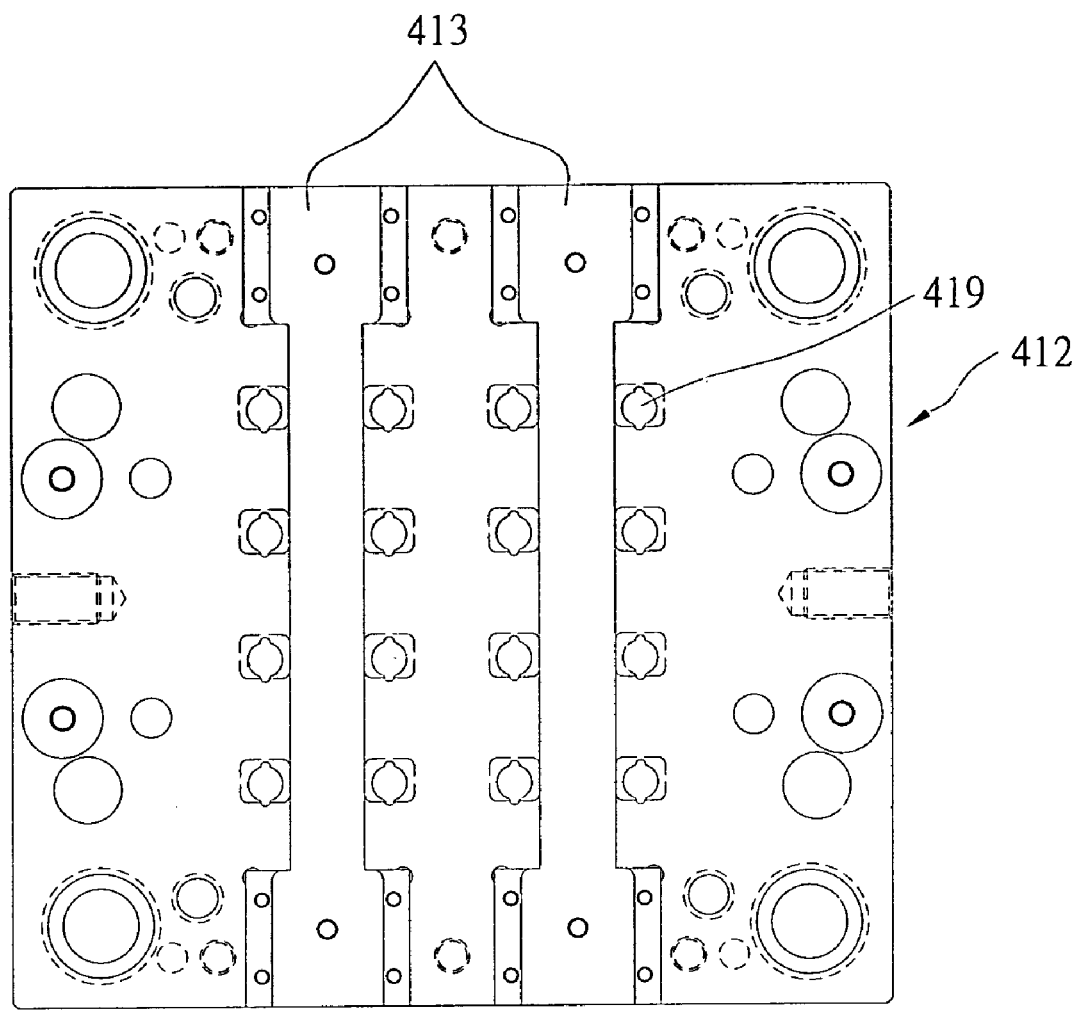
FIG. 8A is a top view of the second fixing board of the present invention.
Figure 8B:
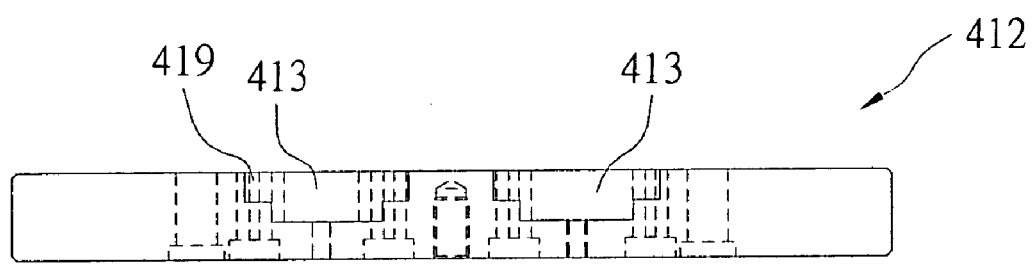
FIG. 8B is a side view of the second fixing board of the present invention.
Figure 9:
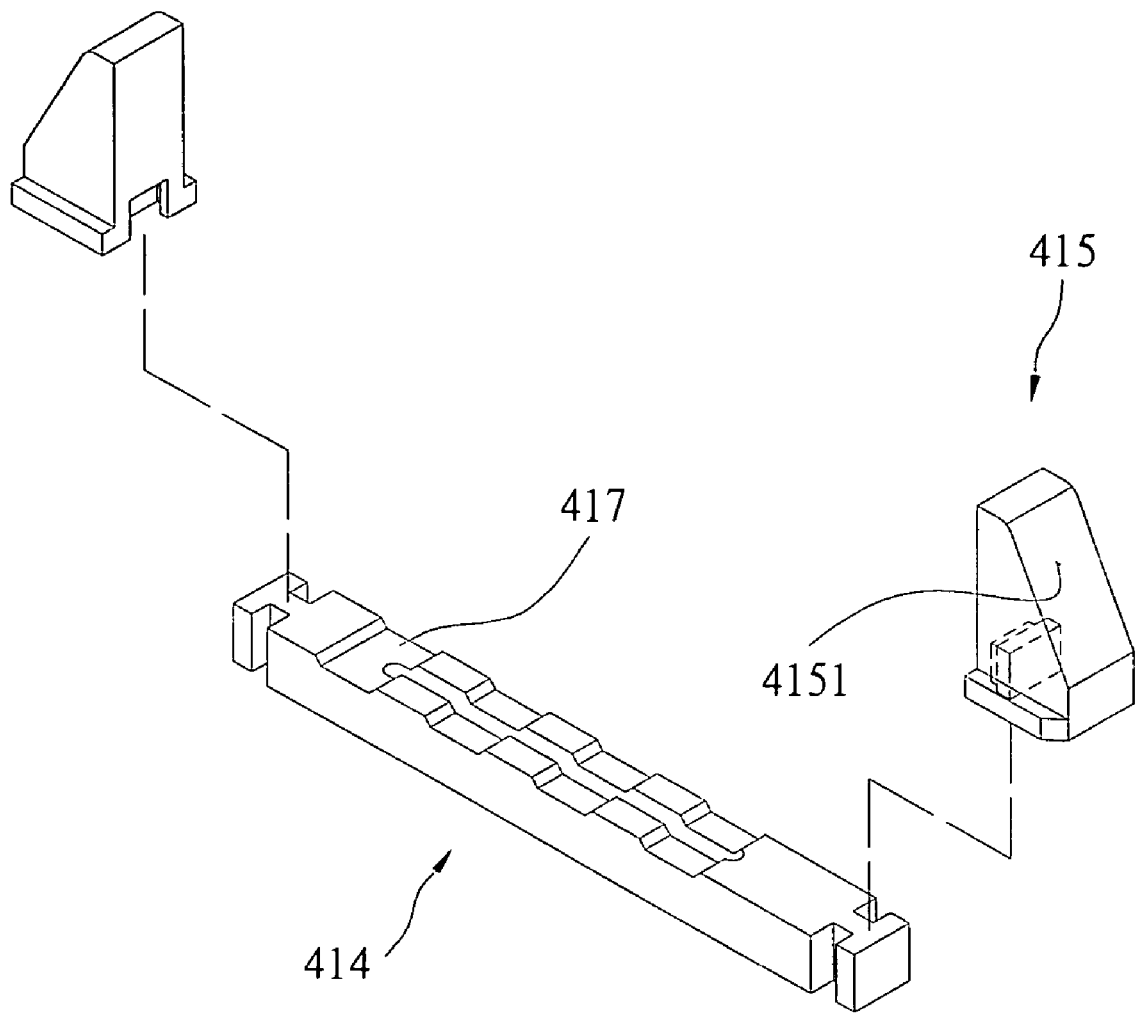
FIG. 9 is an exploded perspective view of the sliding rod and the actuating block of the present invention.

The second fixing board 412 has a plurality of inner mold holes 419, at least one wedged slot 413, at least one sliding rod 414, and at least two actuating blocks 415. The sliding rod 414 and the two actuating blocks 415 are assembled into the wedged slot 413. The actuating blocks 415 are individually installed at the two ends of the sliding rod 414. As shown in FIGS. 8A~9, the second fixing board 412 has sixteen inner mold holes 419 that correspond to the inner mold holes 418 of the first fixing board 411 and the first male mold 32 or the second male mold 52 so that the inner mold holes 418 and the inner mold holes 419 are linked together. Two parallel wedged slots 412 are located at a location that corresponds to the convex blocks 416 of the first fixing board 411. The width of the two ends of the wedged slots is wider. The actuating block 415 is installed wedgedly at the two ends of the sliding rod 414. The installed sliding rod 414 and the actuating block 415 are located in the wedged slot 413 of the second fixing board 412. The surface of the sliding rod 414 that faces to the first fixing board 411 has four concave slots 417 that correspond to the row of four convex blocks 416 so that the sliding rod 414 and the first fixing board 411 insert into or push and push each other. The actuating block 415 has an inclined surface 4151 for being pushed by the firing pins 33 or 53 located at the first male mold fixing base 31 or the second male mold fixing base 51 so that the actuating block 415 and the sliding rod 414 can be slidly moved in the wedged slot 413.

The outer female molds 42 are located at a surface that is opposite to the surface of the first fixing board 411 having the convex blocks 416. In the inner part of the outer female molds 42, there is a through hole 421 (as shown in FIG. 10) that corresponds to the inner mold hole 418 of the first fixing board 411. The inner female molds 43 are plugged into the through hole 421 of the outer female mold 42 and the inner mold holes 418, 419 of the first fixing board 411 and the second fixing board 412. One end of the inner female molds 43 that is far away from the first male mold 32 is installed at the second female fixing base 44. The second female mold fixing base 44 is located at the female mold 4 and is adjacent to the first female mold base 41. At the inner part of the inner female molds 43, there is a through hole 431 so that the thimbles 45 are plugged into the corresponding through hole 431. The thimbles 45 are located at the thimble base 46.

As shown in FIG. 10, a through hole 421 is formed in the inner part of the outer female mold 42. At the side wall of the outer female mold 42, a runner 422 is formed. When the female base 4 and the second male mold base 5 are molded, the plastic material flows into the second male mold 52 and the molding space between the outer female mold 42 and the inner female mold 43 via the runner 422. The inner female mold 43 is plugged into the through hole 421 of the outer female mold 42. A through hole 431 is also formed at the inner female mold 43 for being plugged with the thimble 45.

Figure 11:
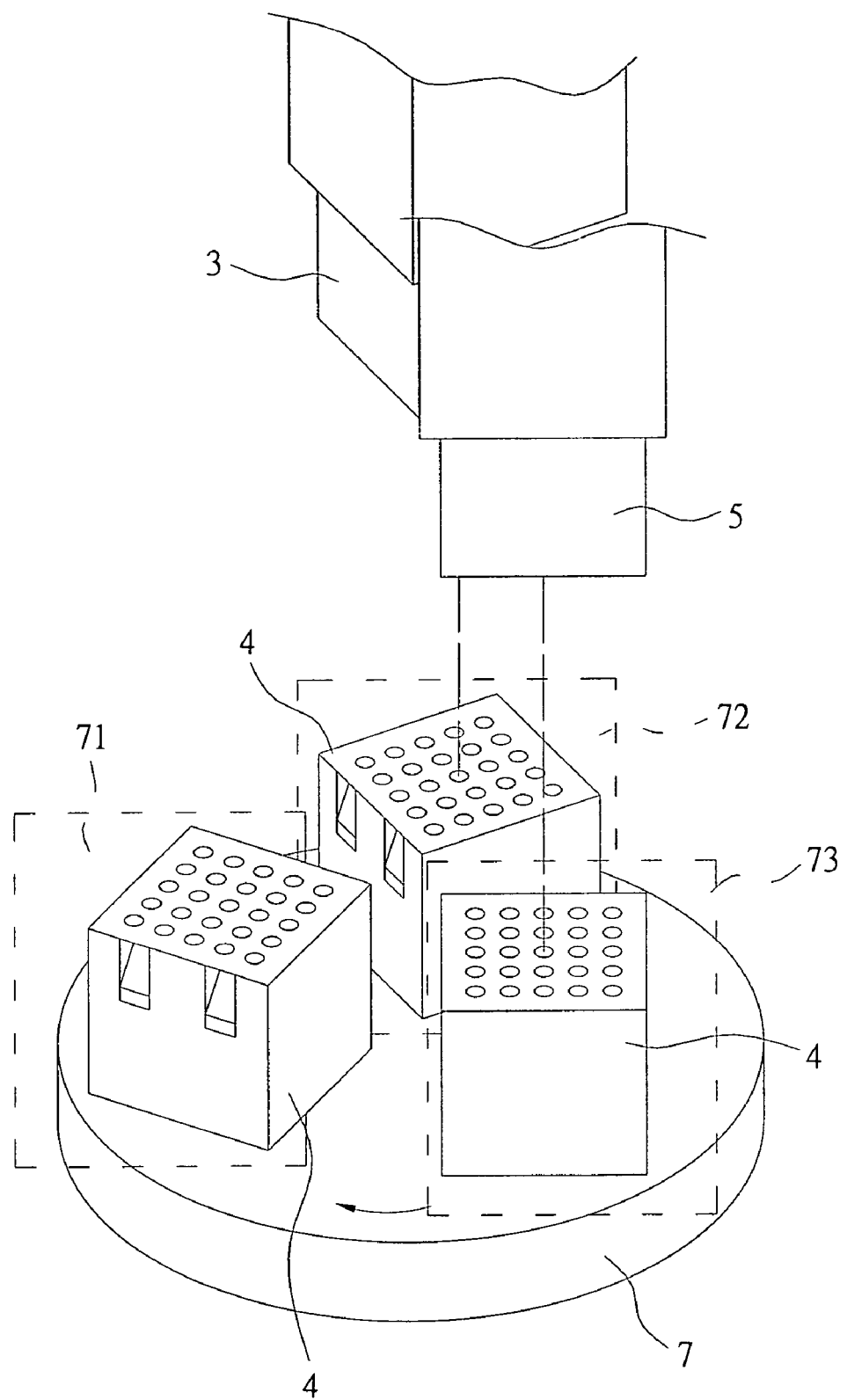
FIG. 11 is a schematic diagram of the implementing method of the first embodiment of the present invention.

FIG. 11 shows the spike mold structure of the first embodiment of the present invention. Three female mold bases 4 are circularly located at a rotatable circular board 7 of an injection machine (not shown in the figure). A first male mold base 3 and a second male mold base 5 are located above two of the female mold bases 4. The first male mold base 3 and the second male mold base 5 are disposed clockwise. The area without the first male mold base 3 or the second male mold base 5 is the operating area 71. The area located with the first male mold base 3 is a first molding area 72, and the area located with the second male mold base 5 is a second molding area 73. The operating area 71 is used for placing the metal connection part (not shown in the figure) of the spike (not shown in the figure) onto the female mold base 4 and taking the molded spike out. After the connection part of the spike is placed, the circular board 7 is rotated clockwise to make the female mold base 4 originally located at the operating area 71 move to the first molding area 72, and the two female mold bases 4 originally located at the first molding area 72 and the second molding area 73 are individually moved to the second molding area 73 and the operating area 71. A base part (not shown in the figure) is molded with the connection part at the first molding area 72, and a spike part (not shown in the figure) is molded with the base part at the second molding area 73. Thereby, a bi-colored spike having a metal connection part is molded. The bi-colored spike is continuously molded via the rotation of the circular board 7 and the disposition of the first male mold base 3 and the second male mold base 5. In this way, only one operator is needed. The manufacturing time and manpower required are reduced.

Figure 4:
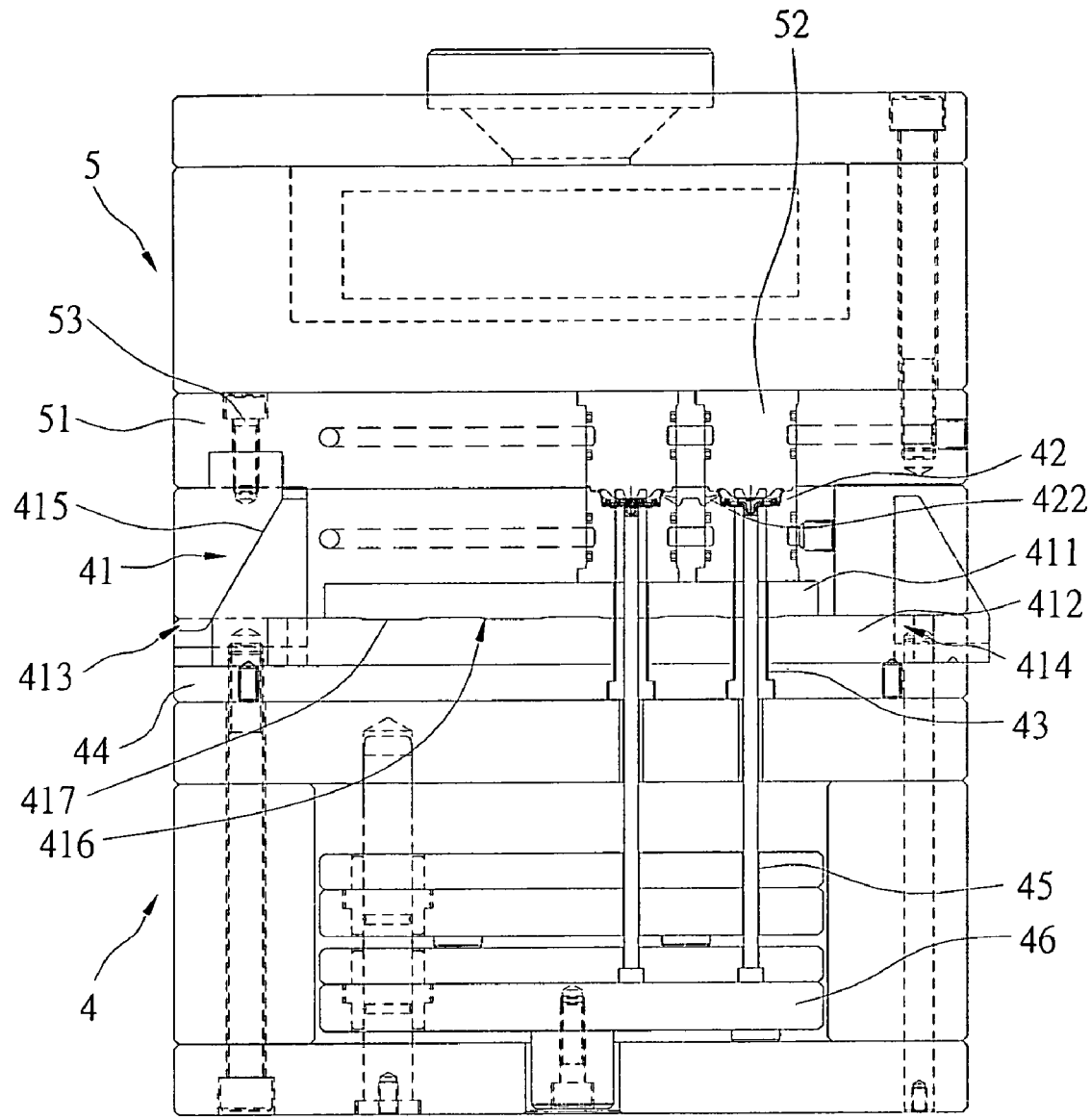
FIG. 4 is a schematic diagram of the second male mold base corresponding to a female mold base of the first embodiment of the present invention.
Figure 12A:
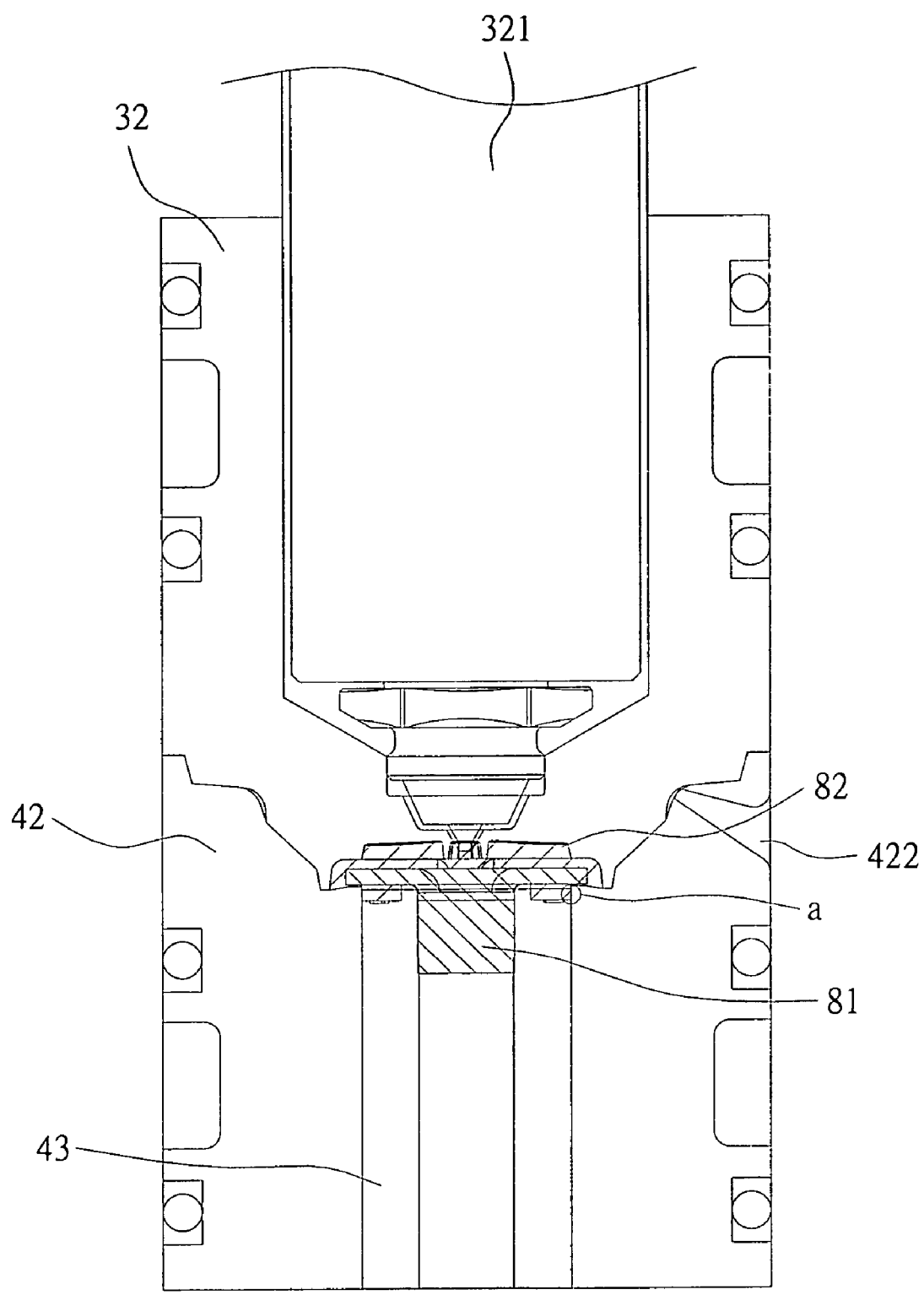
FIG. 12A is a schematic diagram of the first embodiment of the present invention having been molded by the first injection molding process.
Figure 12B:
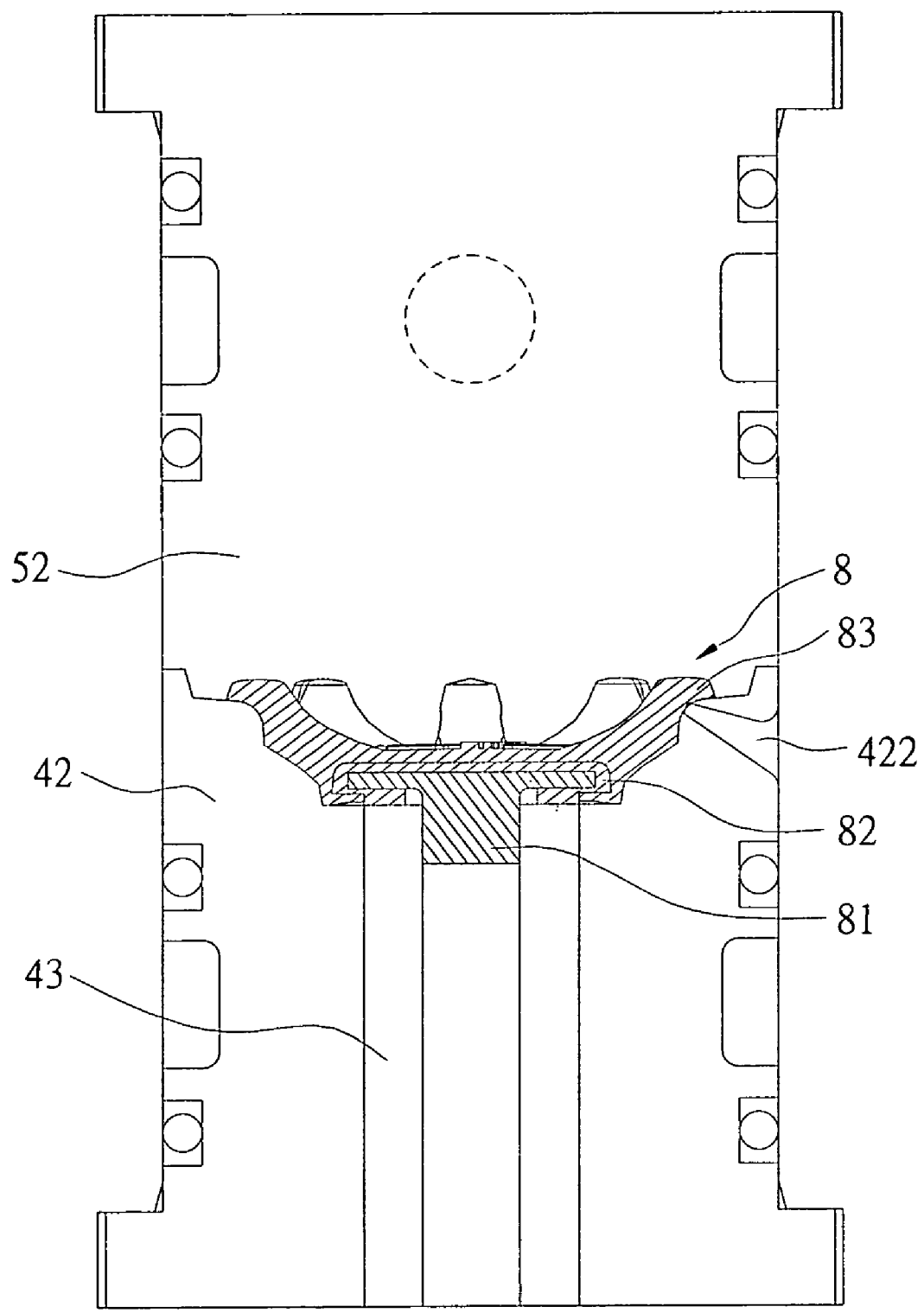
FIG. 12B is a schematic diagram of the first embodiment of the present invention having been molded by the second injection molding process.

Reference is made to FIGS. 3, 4, 12A, and 12B. FIG. 12A shows a schematic diagram of the first embodiment of the present invention having been molded by the first injection molding process. It is also a molded status of the first male mold base 3 fitting in with the female mold base 4, as shown in FIG. 3. When the first molding process is implemented, the firing pin 33 of the first male mold base 3 pushes one of the actuating block 415 of the female mold base 4 to make the convex block 416 of the first fixing board 411 of the female mold base 4 and the convex slot 417 of the sliding rod 414 be spaced at intervals. Therefore, a gap is formed (as shown in FIG. 3) between the first fixing board 411 and the second fixing board 412 so that a displacement is formed at the intersection of the outer female mold 42 and the inner female mold 43. After the first male mold base 3 fits into the female mold base 4, the plastic material is injected via the runner 321 of the first male mold 32 to form a base part. 82 onto a connection part 81. The first molding process is implemented. FIG. 12B shows a schematic diagram of the first embodiment of the present invention having been molded by the second injection molding process. It is also a molded status of the second male mold base 5 fitting into the female mold base 4, as shown in FIG. 4. When the second molding process is implemented, the firing pin 53 of the second male mold base 5 pushes another actuating block 415 of the female mold base 4 to make the sliding rod 414 slidingly move in a direction that is opposite to the direction of the first molding process so that the convex block 416 of the first fixing board 411 embeds with the convex slot 417 of the sliding rod 414. Therefore, the first fixing board 411 is embedded closely with the second fixing board 412 and the outer female mold 42 moves downward with the displacement a.

This means there isn't a gap at the intersection of the outer female mold 42 and the inner female mold 43 and the base part moves upward with the displacement a. After the second male mold base 5 fits into the female mold base 4, the plastic material is injected via the runner 422 of the outer female mold 42 to form a spike part 83 onto the base part 82. The second molding process is implemented and a spike is molded. The firing pins 33 and the thimbles 53 are individually located at the first male mold fixing base 31 and the second male mold fixing base 51 and correspond to each other.

Because the base part 82 moves upward toward the displacement a during the second molding process, the spike part 83 wraps around part of the base part 82 when the spike part 83 is molded. Therefore, the connection strength is stronger between the base part 82 and the spike part 83 of the spike 8. The bi-colored spike is molded and has increased strength. Two continuous molding processes are adapted to increase manufacturing efficiency and decrease manpower costs.

Figure 13:
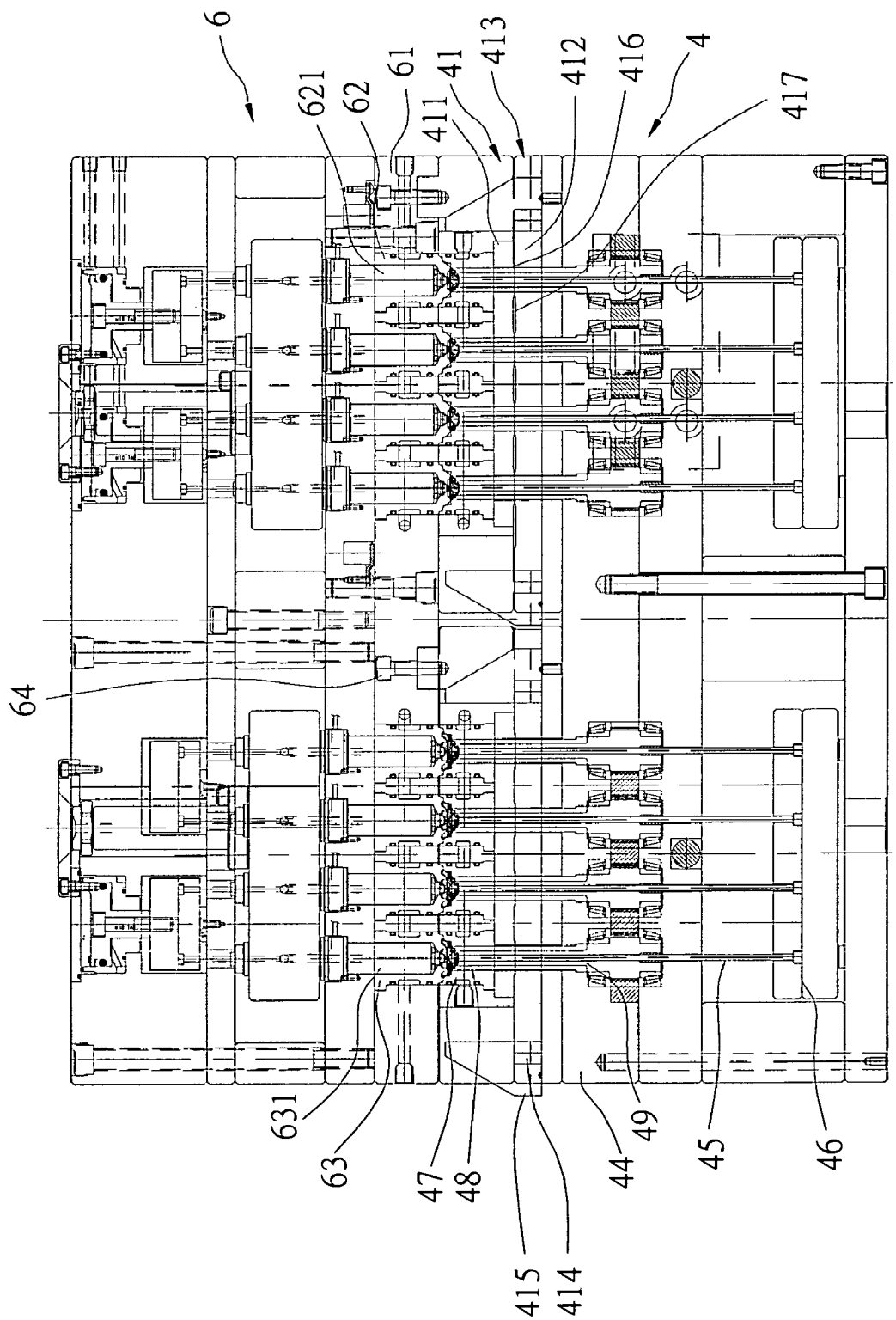
FIG. 13 is a schematic diagram of the second embodiment of the present invention.

Reference is made to FIG. 13, which shows the second embodiment of the present invention. The spike mold structure includes a male mold base 6, and a female mold base 4 that correspond to each other.

The male mold base 6 includes a male mold fixing base 61, a plurality of first male molds 62, a plurality of second male molds 63, and at least two firing pins 64. The first male molds 62 and the second male molds 63 are symmetrically located at two sides of the male mold fixing base 61. The firing pins 64 are also located at the male mold fixing base 61, and are located at the same side that corresponds to the first male mold 62 and the second male mold 63.

The female mold base 4 includes two first female mold fixing bases 41, a second female mold fixing base 44, a plurality of thimbles 45, and two thimble bases 46, a plurality of first female molds 47, a plurality of second female molds 48, and a plurality of third female molds 49. The two first female mold fixing bases 41 correspond to the first male molds 62 and the second male molds 63, and are located at the two sides of the female mold base 4. The structure of the two first female mold fixing bases 41 is the same as the structure of the first female mold fixing base 41 of the first embodiment. The first female molds 47 are located at the surface that is opposite to the surface of the first fixing board 411 of the two first female mold fixing bases 41 having the convex block 416. In the inner part of the first female molds 47, there is a through hole 471. The second female molds 48 are plugged into the through holes 471 of the first female molds 47 and the inner mold holes 418, and 419 of the first female mold fixing bases 41. One end of the second female molds 48 that is far away from the male mold base 6 is installed at the second female fixing base 44 and is adjacent to the first female mold base 41. At the inner part of the second female molds 48, there is a through hole 48. The third female molds 49 are individually plugged into the through holes 481 of the second female molds 48, and one end of the third female molds 49 that is far away from the male mold base 6 is installed at the second female fixing base 44 and is far away from the first female mold base 41. At the inner part of the third female molds 49, there is a through hole 492 that is used for plugging into the thimbles of the thimble base 46.

Figure 14A:
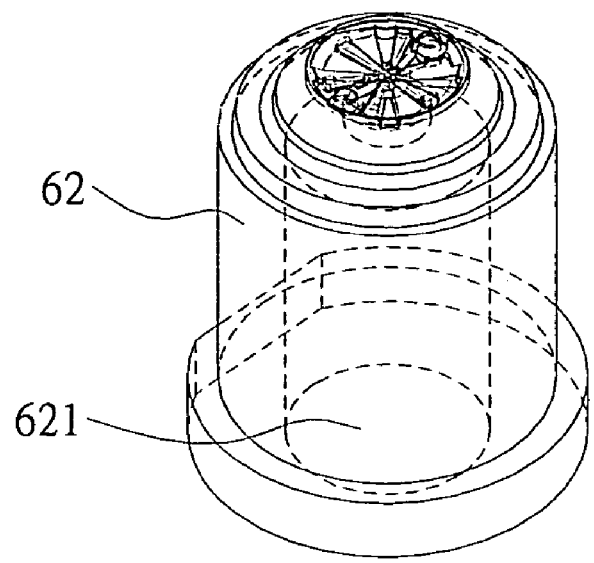
FIG. 14A is a perspective view of the first male mold of the second embodiment of the present invention.
Figure 14B:
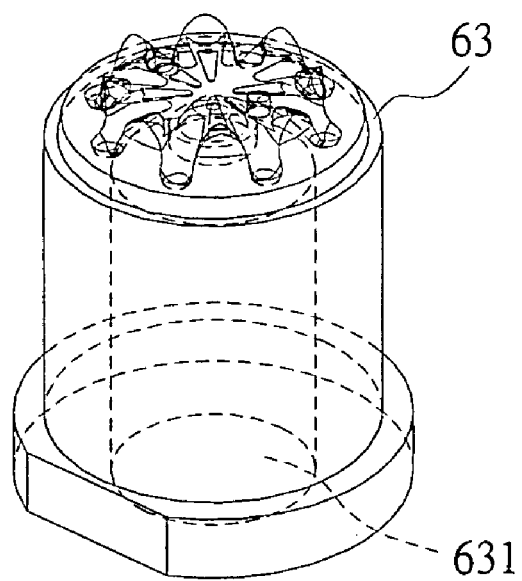
FIG. 14B is a perspective view of the second male mold of the second embodiment of the present invention.
Figure 15:
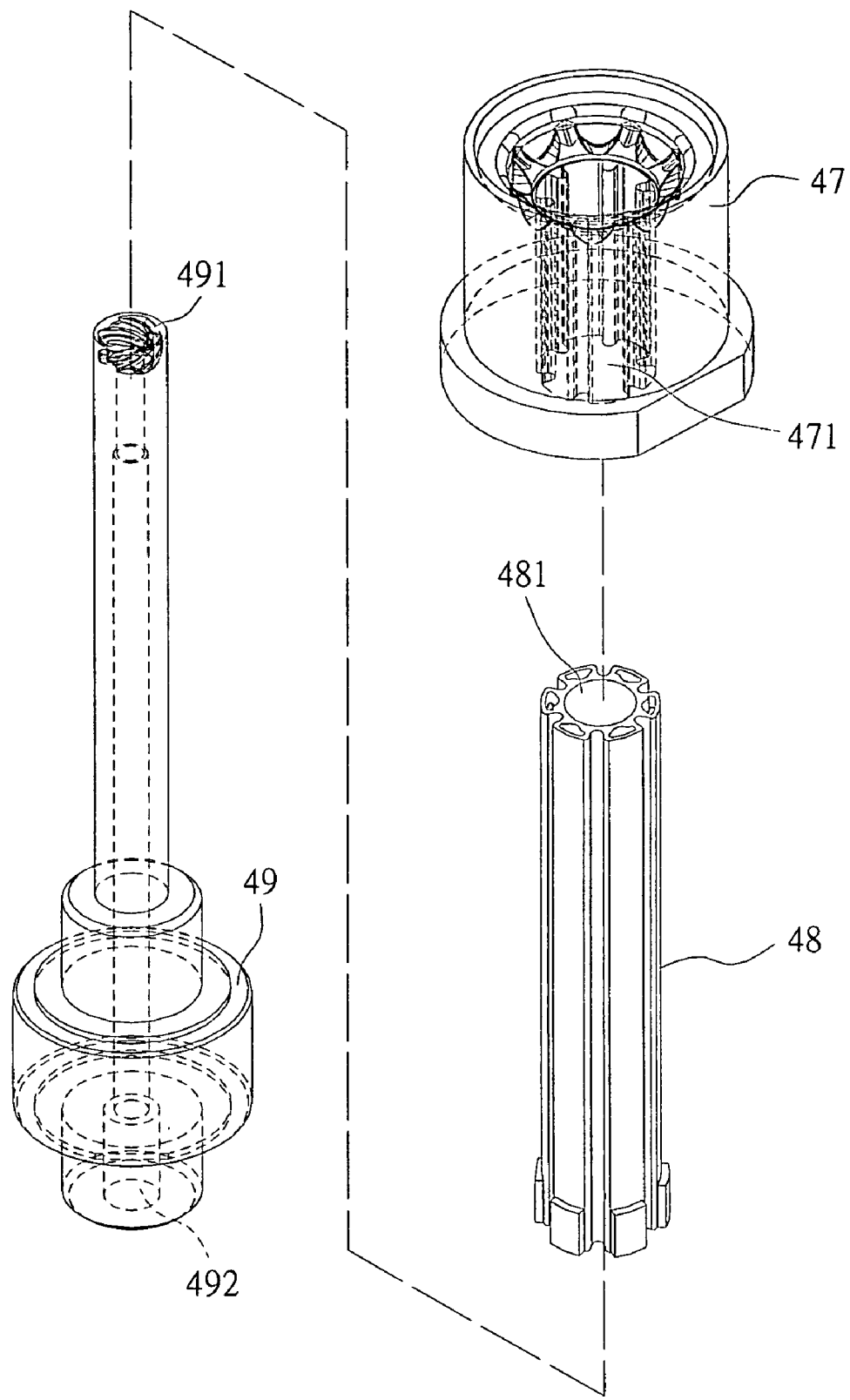
FIG. 15 is an exploded perspective view of the first female mold, the second female mold and the third female mold of the second embodiment of the present invention.

As shown in FIGS. 14A and 14B, in the inner part of the first male mold 62 and the second male mold 63, there are runners 621 and 631. FIG. 15 is an exploded perspective view of the first female mold 47, the second female mold 48, and the third female mold 49 of the second embodiment of the present invention. In the first female mold 47, the second female mold 48 and the third female mold 49 there is a through hole 471, 281, and 492. The front end of the through hole 492 of the third female mold 49 forms a thread mold 491 for molding the thread of the connection part. The through hole 471 of the first female mold 47 is plugged by the second female mold 48, the through hole 481 of the second female mold 48 is plugged by the third female mold 49, and the through hole 492 of the third female mold 49 is plugged by the thimble 45.

Figure 16A:
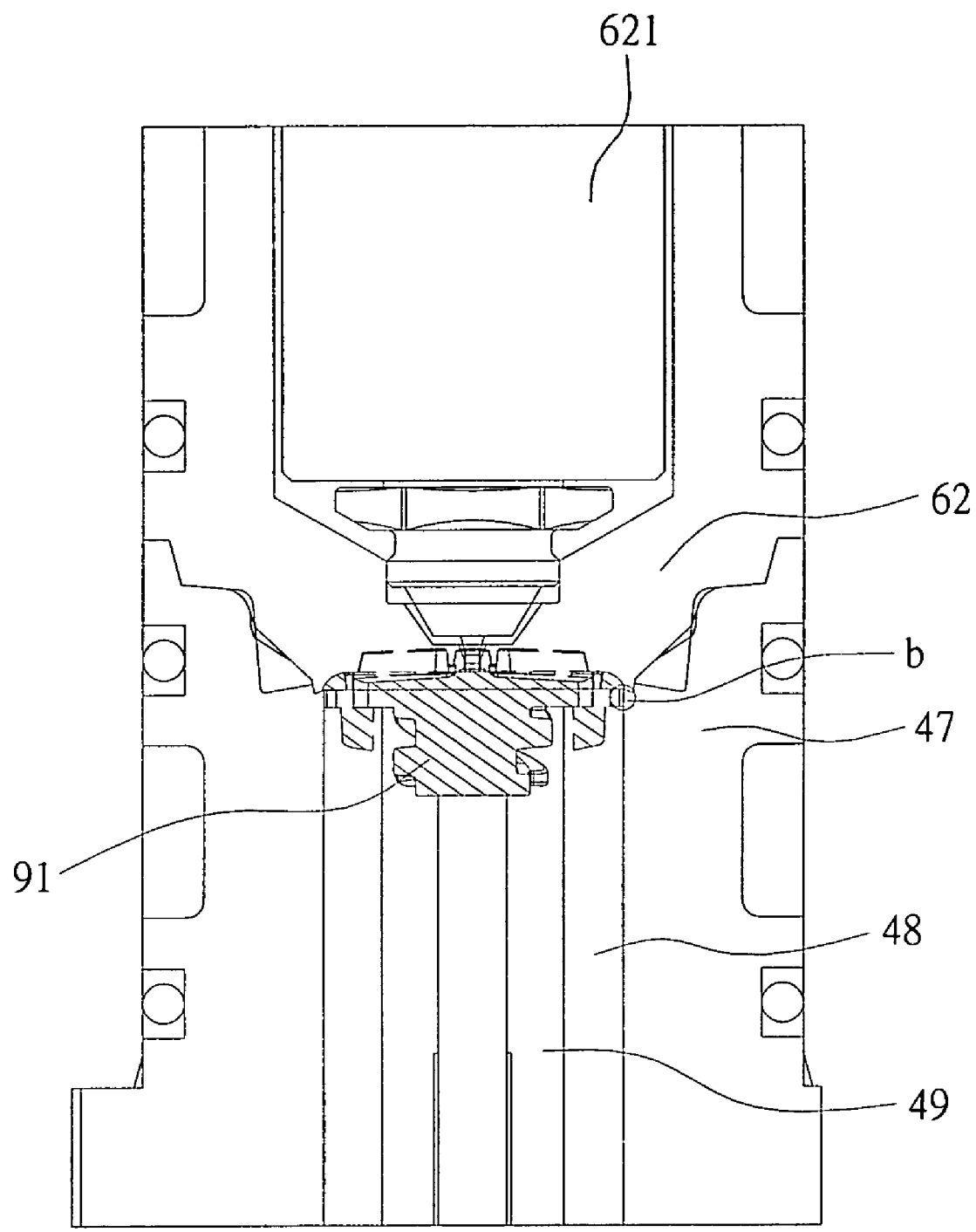
FIG. 16A is a schematic diagram of the second embodiment of the present invention having been molded by the first injection molding process.
Figure 16B:
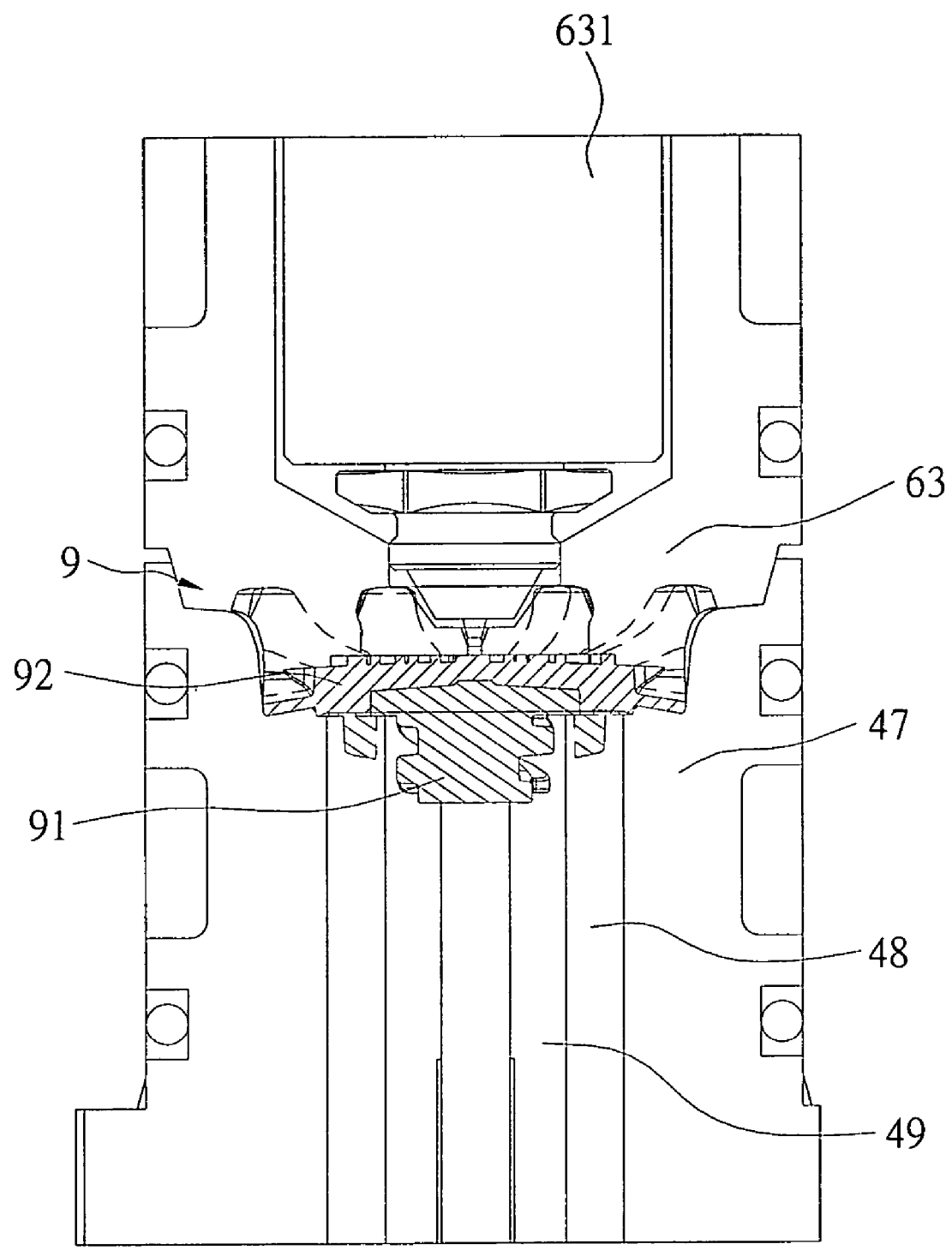
FIG. 16B is a schematic diagram of the second embodiment of the present invention having been molded by the second injection molding process.

Reference is made to FIGS. 13, 16A, and 16B. FIG. 16A shows a schematic diagram of the second embodiment of the present invention having been molded by the first injection molding process. FIG. 16B shows a schematic diagram of the second embodiment of the present invention having been molded by the second injection molding process. When the first molding process is implemented, the male mold base 6 and the female mold base 4 a mold match is first performed. The first male mold 62 located at one side of the male mold fixing base 61 fits into the corresponding first female mold 47, second female mold 48, and third female mold 49. The second male mold 63 located at another side of the male mold fixing base 61 also fits into the corresponding first female mold 47, second female mold 48, and third female mold 49. The firing pin 64 pushes the actuating blocks 415 of the two first female mold fixing bases 41 to make the sliding rods 414 of the two first female mold fixing base 41 move in the same direction. As shown in FIG. 13, the convex block 416 of the first fixing board 411 of the first female mold fixing base 41 located a side that is opposite to the first male molds 62 and the concave slot 417 of the sliding rod 414 are placed at intervals. Therefore, a gap is formed between the first fixing board 411 and the second fixing board 412 so that a displacement b is formed at the intersection of the first female mold 47 and the second female mold 48. At the same time, the convex block 416 of the first fixing board 411 of the first female mold fixing base 41 located on a side that is opposite to the second male molds 63 and the concave slot 417 of the sliding rod 414 are closely embedded. Thereby, the first fixing board 411 is also closely embedded with the second fixing board 412 so that the first female mold 47 moves downward with a displacement b. There is no any displacement at the intersection of the first female mold 47 and the second female mold 48, and there also is no displacement at the intersection of the second female mold 48 and the third female mold 49.

Next, the plastic material is injected into the space formed by the first male mold 62 and the corresponding first female mold 47, second female mold 48 and the third female mold 49, and the space formed by the second male mold 63 and the corresponding first female mold 47, the second female mold 48 and the third female mold 49 via the runner 621 of the first male mold 62 and the runner 631 of the second male mold 63. Thereby, the connection part 91 of a spike 9 is molded in the first male mold 62 and the corresponding first female mold 47, second female mold 48 and the third female mold 49, and the spike part 92 is molded on the connection part 91 of the spike 9 in the second male mold 63 and the corresponding first female mold 47, the second female mold 48 and the third female mold 49. Because the first female mold 47 moves downward with the displacement b, the connection part 91 moves upward with the displacement b. When the connection part 91 is molded at the second molding process, the spike part 92 wraps with part of the base part 82 when the spike part is molded. Thereby, the connection strength between the connection part 91 and spike part 92 of the spike 9 becomes stronger.

Finally, the male mold base 6 and the female mold base 4 are opened. The molding machine (not shown in the figure) rotates the female mold base 180 degrees and the thimble 45 takes the molded spike 9 having the connection part 91 and the spike part 92 off. Therefore, the first female mold 47, the second female mold 48 and the third female mold 49 located on the same side as the first male mold 62 are cleared up, and the first female mold 47, the second female mold 48 and the third female mold 49 located on the same side as the second male mold 63 has the molded connection part 91. Then, the male mold base 6 fits into the female mold base 4 again. The location of the sliding rod 414 has been changed to the opposite direction due to the female mold base 4 being rotated 180 degrees. The firing pin 64 pushes the sliding rod 414 along the previous direction so that the two first female mold fixing bases 41 become the status, so there is a gap between the first fixing board 411 and the second fixing board 412 located at one side, and the first fixing board 411 and the second fixing board 412 located at another side are closely embedded, and the spike is molded. Thereby, the bi-colored spike 9 having a plastic connection part 91 is molded via two continuous molding processes. The molding process and the de-molding process are automatically performed. Manufacturing time is reduced, manufacturing efficiency is increased, and manpower costs are decreased.

The spike mold structure forms a bi-colored spike having increased strength. Two continuous molding processes are adapted to increase manufacturing efficiency and decrease manpower costs.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A spike mold structure, comprising:
    a first male mold base, including:
        a first male mold fixing base;
        a plurality of first male molds located at the first male mold fixing base; and
        at least one firing pin located at one side of the first male mold fixing base;
    at least one female mold base, corresponding to the first male mold base, the female mold base including:
        a first female mold fixing base including a first fixing board and a second fixing board, wherein the first fixing board and the second fixing board have a plurality of inner mold holes and their number and location correspond to the first male molds, the second fixing board has at least one wedged slot having a sliding rod, there is an actuating block at two ends of the sliding rod, one surface of the sliding rod that is adjacent to the first fixing board has a plurality of concave slots, the first fixing board has a plurality of convex blocks that correspond to the concave slots of the sliding slots, and the actuating block corresponds to the firing pin of the first male mold fixing base;
        a plurality of outer female molds are individually located at another surface of the first fixing board of the first female fixing base that is opposite to the convex block, wherein a through hole is formed at an inner part of each of the outer female molds and the through hole corresponds to the inner mold hole of the two first fixing boards;
        a plurality of inner female molds are plugged into the through hole of the outer female mold and are plugged into the inner mold holes of the corresponding first female fixing base, wherein one end of the inner female molds that is far away from the first male mold is installed at the second female fixing base, and each of the inner female molds has a through hole; and
        a plurality of thimbles are individually located at a thimble base and plugged into the corresponding through hole of the inner female molds.

2. The spike mold structure as claimed in claim 1, wherein a runner is formed in the inner part of each of the first male molds.

3. The spike mold structure as claimed in claim 1, wherein the actuating block has a slope.

4. The spike mold structure as claimed in claim 1, wherein a side wall of each of the outer female molds has a runner.

5. The spike mold structure as claimed in claim 1, further comprising:
    a second male mold base corresponding to the female mold base, wherein the second male mold includes a second male mold fixing base, a plurality of second male molds, and at least one firing pin, and the second male molds are installed at the second male mold fixing base and the firing pin is located at one side of the second male mold fixing base and corresponds to the actuating block of the first female mold base.

6. A spike mold structure, comprising:
    a male mold base, including:
        a male mold fixing base;
        a plurality of first male molds located at one side of the male mold fixing base;
        a plurality of second male molds located at another side of the male mold fixing base; and
        at least two firing pins installed at the male mold fixing base and located at the same side that corresponds to the first male molds and the second male molds;
    a female mold base, corresponding to the male mold base, including:
        two first female mold fixing bases individually corresponding to the first male molds and the second male molds, wherein the first female mold fixing base includes a first fixing board and a second fixing board, the two first fixing boards and the two second fixing boards have inner mold holes that correspond to the male molds, each of the two second fixing boards has at least one wedged slot and a sliding rod is installed in the wedged slot, there is an actuating block at the two ends of the sliding rod, one surface of the sliding rod that is adjacent to the first fixing board has a plurality of concave slots, the first fixing board has a plurality of convex blocks that correspond to the concave slots of the sliding slots, and the actuating block corresponds to the firing pin of the male mold fixing base;
        a plurality of first female molds individually located at another surface of the first fixing board of the first female fixing base that is opposite to the convex block, wherein a through hole is formed at an inner part of each of the first female molds and the through hole corresponds to the inner mold hole of the two first fixing boards;
        a plurality of second female molds being plugged into the through holes of the first female molds and being plugged into the inner mold holes of the corresponding two first female fixing base, wherein an end of the second female molds that is far away from the first male mold and the second male mold is installed at a side of the second female fixing base that is adjacent to the first female fixing base, and each of the second female molds has a through hole;

a plurality of third female molds being plugged into the through holes of the second female molds, wherein an end of the third female molds that are far away from the first male mold and the second male mold is installed at a side of the second female fixing base that is far away from the first female fixing base, and each of the third female molds has a through hole; and a plurality of thimbles individually located at two thimble bases and plugged into the through hole of the corresponding third female molds.

7. The spike mold structure as claimed in claim 6, wherein a runner is formed in the inner part of each of the first male molds.

8. The spike mold structure as claimed in claim 6, wherein a runner is formed in the inner part of each of the second male molds.

9. The spike mold structure as claimed in claim 6, wherein the actuating block has a slope.

10. The spike mold structure as claimed in claim 6, wherein a thread mold is formed at one front end of the through hole of the third female mold.

* * * * *